Dec. 20, 1960     D. H. FULLER     2,964,938
CHROMATOGRAPHIC GAS ANALYSIS SAMPLE CONTROL SYSTEM
Filed July 11, 1957     2 Sheets-Sheet 1
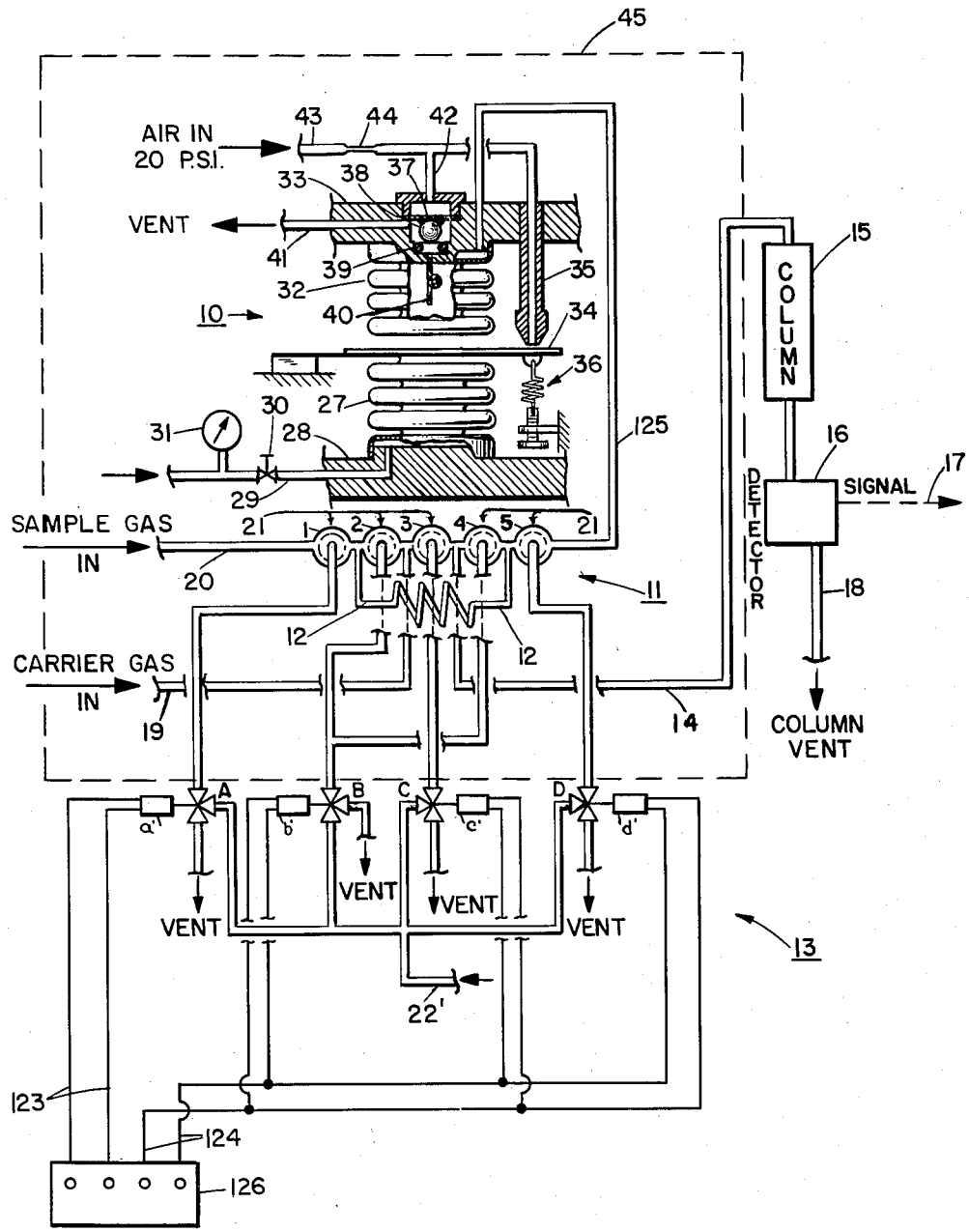
FIG. I
INVENTOR.
DAVID H. FULLER
BY
Lawrence H. Patton
AGENT Dec. 20, 1960 D. H. FULLER 2,964,938
CHROMATOGRAPHIC GAS ANALYSIS SAMPLE CONTROL SYSTEM
Filed July 11, 1957 2 Sheets-Sheet 2
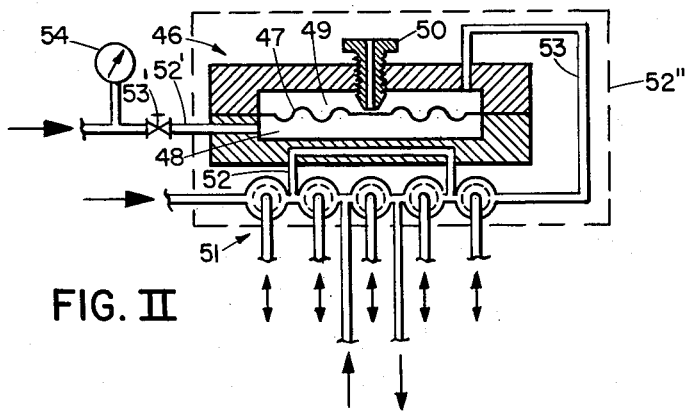
FIG. II
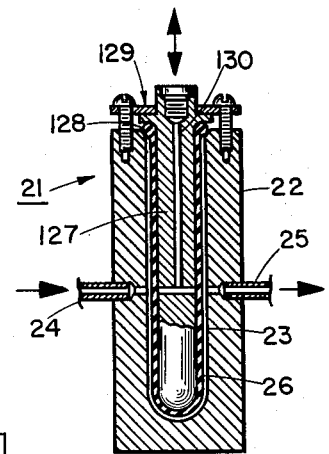
FIG. IV
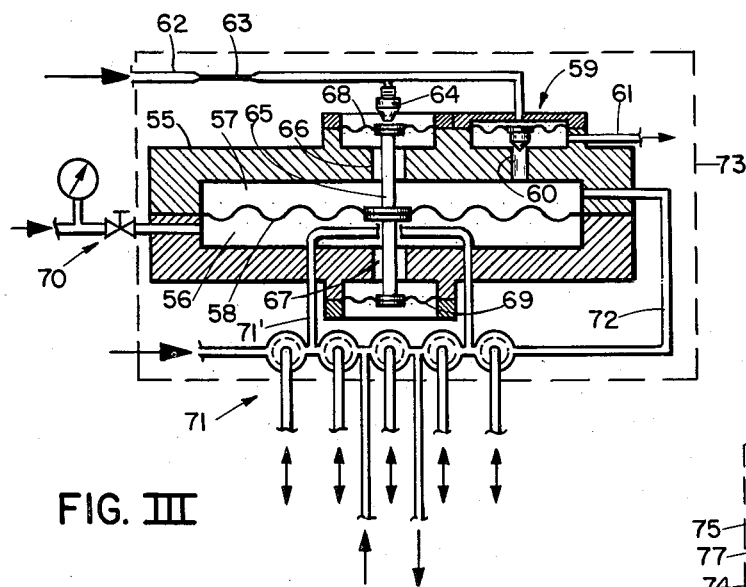
FIG. III
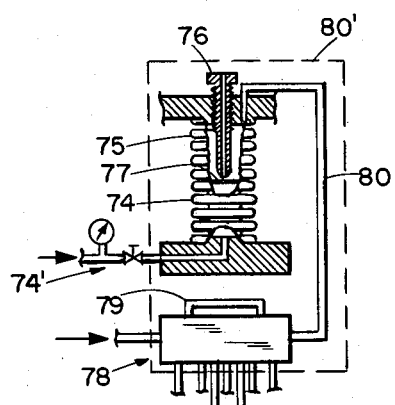
FIG. V
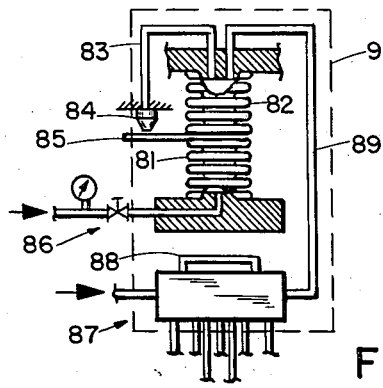
FIG. VI
INVENTOR
DAVID H. FULLER
BY
Lawrence H. Jackson
AGENT

United States Patent Office 2,964,938
Patented Dec. 20, 1960

2,964,938

CHROMATOGRAPHIC GAS ANALYSIS SAMPLE CONTROL SYSTEM

David H. Fuller, Wrentham, Mass., assignor to The Foxboro Company, Foxboro, Mass., a corporation of Massachusetts Filed July 11, 1957, Ser. No. 671,283

6 Claims. (Cl. 73—23)

This invention relates to systems for vapor phase gas chromatography wherein a slug of a sample gas mixture is passed through a chromatographic column for component separation and measurement. In such systems a stream of carrier gas is passed through the system and through the chromatographic column and a slug of sample gas is injected into the stream of carrier gas to be transported thereby to and through the column.

This invention particularly relates to means for providing a sample slug of gas mixture for such measurement by means of a system which provides a fixed volume constant mass of sample gas on an accurately repeatable basis.

In this form of gas chromatography it is important to measure out an exact mass of sample in the gas phase. In industrial process stream use this measurement often must be done under extremes of ambient temperature and barometric pressure conditions. The entire accuracy of the overall chromatographic system depends on the accuracy and repeatability of this sample measuring.

Prior thinking in this matter has been based on taking a fixed volume of sample at a closely held temperature and pressure to achieve a fixed mass of sample. This procedure imposes severe problems in the control of the temperature, necessitating cumbersome thermostatic baths and stable thermostats.

This invention obviates prior difficulties in this respect by automatically providing in a selected fixed volume a gas sample of constant mass on an accurate basis of repeatability. As an example of the structure according to this invention, a fixed volume conduit is provided in conjunction with a pair of opposed bellows. One of the bellows is filled with a reference gas and the other of the bellows is pneumatically connected with the fixed volume conduit as an operating bellows. The operating bellows is provided with a vent valve which is operated from the back pressure of a nozzle, which in turn is variably restricted by a baffle which moves according to the differential pressure between the bellows. Thus with suitable switch arrangements with respect to the fixed volume conduit, the pressure and therefore the density of the sample gas in the fixed volume conduit is varied according to temperature changes in the reference bellows with the result that the mass of the gas in the constant volume conduit is maintained constant. A necessary feature of this invention is that the temperature of the gas in the fixed volume conduit and that of the gas in the reference bellows be maintained equal.

Thus the present invention eliminates the need of temperature control in the prior art sense of control to a fixed point. The present invention requires only the above-mentioned equality plus general insurance of volatility of sample, proper operation of the chromatographic column and the protection of the detector in the output of the chromatographic column. These factors require only the crudest temperature control, if any.

With this invention, therefore, a constant mass of gas sample is maintained is the fixed volume conduit with this constant mass of sample gas equal to the mass of this gas under standard conditions, regardless of temperature. This is strictly true for ideal gases. Actual gases as available on the market will deviate slightly but will cause only small and allowable error. By sealing the same gas into the reference bellows as is applied to the fixed volume sample conduit, any such errors due to deviation from ideal gas laws are cancelled out. Even if, on a more practical operating basis of sealing a gas in the reference bellows which is only similar to the sample gas in the fixed volume conduit, for example, a sample of the same concentration as the average operating sample, virtually all error is eliminated even over relatively wide range of operating temperature.

It is accordingly an object of this invention to provide an improved vapor phase gas sampling system for chromatographic analysis.

Other objects and advantages of this invention will be in part apparent and in part pointed out hereinafter.

In the drawings:

Figure I is a partially schematic illustration of a sampling system according to this invention including associated operating arrangements therefor;

Figure II is an illustration of an alternate form of the structure of this invention with a pair of opposed pressure chambers separated by a diaphragm;

Figure III is a further alternate structure according to this invention in a variation of the structure of Figure II relating to the venting arrangements for the operating pressure chamber;

Figure IV is a cross-sectional illustration of a switch member used in the system of this invention for selectively opening up and isolating the fixed volume sample gas conduit of Figures I through III;

Figure V is an alternate structure, a self-actuating, opposed bellows arrangement with an internal vent nozzle; and Figure VI is a further alternate structure, a self-actuating, opposed bellows arrangement with an external vent nozzle.

The Figure I showing is an illustrative embodiment of this invention as a gas sample control system in a chromatographic gas analysis instrument. It comprises generally a control structure 10 in the form of a pair of opposed bellows and associated structure, a pneumatic valve process switching arrangement 11 which is pneumatically associated with the opposed bellows arrangement 10, a fixed volume gas sample conduit 12 and an operating arrangement for this device comprising a set of solenoid operated pneumatic valves as indicated at 13.

This gas sample control system is provided with an output connection pneumatic pipe 14 through which a gas sample to be measured is carried to a chromatographic column 15. The output of the column 15, in the usual chromatographic analysis system manner, is applied to a suitable detector 16 to produce an output signal in any suitable form as indicated by the arrow 17, with the system's gases being vented through a column vent 18 which leads from the detector 16 to atmosphere.

As will be described in more detail hereinafter, a carrier gas is applied to the system from, at the left of the drawing, a carrier gas inlet 19. Also a sample gas which is to be measured, is applied to this system from, again at the left of the drawing, a sample gas inlet 20. As in the usual operation of a chromatographic analysis system, the carrier gas is first established as flowing through the system to and through the chromatographic column 15. The step to be taken is to provide a slug of sample gas of known mass, and to interject this sample slug into the carrier gas stream so that the sample will be carried to the column 15 for the usual component separation thereby.

The purpose of this invention is to ensure that the sample slug of gas to be measured is always the same amount of gas on an accurately repeatable basis. From a structural standpoint, this is accomplished in this device by providing the fixed volume conduit 12 for containing the slug of sample gas which is to be measured and, by automatic operation of the sample control system of this invention, to insure that the fixed volume conduit 12 is provided with a constant mass of gas, regardless of temperature and barometric pressure variations. Chromatographic analysis is the process of separating and measuring the components in a gaseous mixture by passing the mixture through a chromatographic column in a carrier stream of gas. This is ordinarily done on the basis of known components which will separate out in the chromatographic column in known order and on a known time basis. The factor being measured is the quantity of each component in a particular sample to provide a percentage composition measurement. On this basis therefore, it is essential that the sample slug of gas which is to be measured should provide the same amount of gas regardless of temperature or barometric pressure changes. This is accomplished in this device by establishing a fixed volume conduit such as the pipe 12 and by automatically varying the pressure therein to compensate for temperature changes which vary the density of such gas, and to do this on the basis of a cancelling out of the barometric pressure effects on such a system.

The pneumatic switching changes which are made to isolate, control, and then inject into the carrier, the sample gas, are accomplished through the use of suitable pneumatic switches as indicated in the Figure I series of switches 21 marked 1 to 5. An illustration of the switch 21 is given in Figure IV. This Figure IV pneumatic switch is a unit for controlling gaseous flow. It comprises a switch block 22 having a generally cylindrical dead-end recess 23 extending thereinto. In a transverse arrangement with respect to the switch recess 23, a gas inlet passage 24 is provided, about midway the length of the recess 23, for the introduction of gas to the recess 23 through the side wall thereof. Similarly, in lengthwise alignment in the recess 23 and diametrically opposite to the gas input passage 24, a gas outlet passage 25 is provided. Thus with the mouth of the recess 23 suitably sealed, gas may be made to flow into the recess 23 through the inlet passage 24, and transversely, although circuitously as will be seen hereinafter, across the recess 23 and out through the outlet passage 25. Such gas, in connection with the use of this switch unit in the operation of a chromatographic system, may be either the carrier gas or the sample gas, according to the particular desired use and arrangement of the overall switch unit.

Within the Figure IV switch recess 23 and extending substantially the full length thereof, a flexible sock-like sleeve 26 is provided, and may be formed of a suitable grade of rubber, plastic or the like. For example, butyl rubber may be used, or combinations thereof which are usable in relatively high temperature conditions. The inlet and outlet passages 24 and 25 may thus be closed off upon the application of a fluid pressure to the interior to the tube 26.

When the switch unit of Figure IV is in its off, unenergized condition, the flexible sleeve 26 in the recess 23 is at least partially collapsed and the process gas passes between the inlet 24 and the outlet 25 by travelling transversely around the tube 26. As a means of preventing the full collapse of the sleeve 26 and the possible consequent blocking of one or both of the passages 24 and 25 when the switch is in its off condition, a rigid finger-like support member 127 is mounted within the flexible sleeve 26. This rigid member 127 is generally cylindrical with its diameter about that of the normal relaxed inside diameter of the sleeve 26. The finger 127 extends throughout the length of the flexible sleeve 26.

The flexible sleeve 26 is preferably slightly stretched lengthwise over the finger 127. As in Figure IV, the mouth of the sleeve 26 is in the form of an annulus 128 which is seated in an annular counterbore formed in the switch block 22 at the mouth of the recess 23. Downward pressure of the sleeve annulus 128 provides a sealed relationship of the sleeve 26 both with the switch block 22 and with the inner finger 127. A suitable holding plate end arrangement is provided as at 129 for insuring this sealing off arrangement.

The switch operating fluid, which may be air, is applied to the interior of the flexible sleeve 26 through a passage 130 which enters the outer end of the finger 127 and proceeds downwardly therethrough to a lengthwise central point and thence transversely through the finger to the interior of the flexible sleeve 26 about opposite the process gas inlet and outlet passages 24 and 25.

In the operation of the Figure IV structure, the switch "off" condition finds zero or minimum internal fluid pressure in the sleeve 26 and the "process" fluid flow travelling from the inlet 24 to outlet 25 around the sleeve 26. In the switch "on" condition, the fluid pressure expands the sleeve 26 into area contact with the wall of the recess 23 to block off the inlet and outlet passages 24 and 25 to shut off the process flow.

Thus, again referring to Figure I, there are five switch units 21, (1 to 5) each formed as shown and described in connection with Figure IV. It may be noted that each of the operating pressure conduits in this arrangement leads to the center of its particular switch unit and the carrier and sample gas connections, as well as those of the fixed volume conduit 12, lead either to the side wall of one of the switch units or to a passage between side walls of adjacent switch units. In the Figure I showing of the switch units, the flexible sleeve, that is, element 26 of Figure IV, is indicated by a circular dotted line in each switch showing.

In the operating switch arrangement 13, four three-way pneumatic valves A, B, C, and D are provided. Each of these valves is operated by a solenoid individual to it as indicated at $a'$, $b'$, $c'$, and $d'$. These valves operate to admit or vent controlling air to or from the various operating valves 21. A single source of such operating air is provided through pipe 22' and by means of various branches is applied to all of the three-way valves A, B, C, and D at the same time. However, the operating air does not reach the switches 21 until such time as the particular schedule operates the proper solenoid so that the operating air can pass through the indicated three-way valve. The solenoid $a'$ is separately operated as indicated by the electrical lead lines 123 and the solenoids $b'$, $c'$, and $d'$ are jointly operated as indicated by the common electrical leads 124 thereto. Thus the valve A may be operated individually or in suitable concert with any of the other valves whereas valves B, C, and D are all operated together. However, the operation of the valve B is opposite to that of the valves C and D. When the valve B is operated on an air to close basis with respect to the process switches 2 and 4, valves C and D would be the opposite and would operate on a vent basis with respect to process switches 3 and 5 respectively. This difference is illustrated in the drawing by the position of the vent to atmosphere in valve B as coming from the side of the valve and valves C and D as coming from the bottom of the valve.

Accordingly, in the operation of the switches 21 with respect to the operation of the double bellows unit 10, in the initial condition, switches 1, 3 and 5 are open, and switches 2 and 4 are closed. With this arrangement the carrier gas enters the pipe 19, passes through switch 3 and exits through pipe 14 to the column 15. At the same time, the sample gas enters through pipe 20, passes through switch 1, then through the fixed volume conduit 12, then through switch 5, and out therefrom through an output pipe 125 to the double bellows unit 10 as will be described hereinafter. With the switch arrangement in this condition an overage of pressure is passed through the fixed volume conduit 12 and into the bellows arrangement 10. At this point, the switch 1 is closed and thereafter the sample control action of this system takes place to bring about a constant mass in the fixed volume conduit 12. When a sufficient time has passed to achieve this constant mass condition, then the switches 3 and 5 are closed and switches 2 and 4 are opened, with the switch 1 remaining closed. Thus the sample gas inlet is shut off at the switch 1 and the switching arrangement 11 is cut off from the double bellows control arrangement 10 by the closing of the switch 5. The carrier gas however, in this new arrangement, enters through the inlet pipe 19, passes through switch 2, pushes the controlled sample gas out of the fixed volume conduit 12, through the switch 4 and into the outlet pipe 14, and thence to the column 15 for the chromatographic separation action therein. This whole operation can then be programmed through suitable switching action with respect to the electrical switch box 126 so as to apply another controlled mass sample of gas to the column 15. In this manner, this system may be arranged for continuous, though intermittent, sampling on a repetitive batch process schedule.

With respect to the double bellows arrangement 10, a reference bellows 27 is mounted on a base 28. This gas filled bellows is closed during the operation of the device. It is provided with a gas supply tube 29 with a shut-off valve 30 and pressure indicator 31. This supply tube has the function of initially filling the bellows with reference gas or thereafter changing the gas to a different reference gas as desired, or adjustably changing the pressure in the bellows 27. Such pressure adjustment has the effect on the overall system of making it appear that a different size fixed volume conduit 12 has been substituted for the pipe 12. However, in any case, such gas insertion into the bellows 27, such gas adjustment or change is all on a pre-operation basis with respect to this system so that when the system is operated there is a calculated, fixed amount of selected gas in the bellows 27 with the bellows as a closed member. An operating bellows 32 is mounted on a support plate 33 and in opposition to the expansion of the bellows 27 to provide a differential movement with respect to the reference gas pressure in the bellows 32. This differential pressure is expressed in the movement of a baffle plate 34 which is mounted between the bellows 27 and 32 and which moved in variably restricting action with respect to a nozzle 35. A spring loading arrangement 36 is provided with respect to the baffle 34 with screw adjustment to selectively vary, prior to operation, the action of the baffle 34 with respect to the nozzle 35 according to the particular conditions of a specific analysis. The pneumatic switches 21 are connected to the operating bellows 32 through the pipe 125 and may be shut off therefrom by the switch 5. In this fashion the fixed volume conduit 12 is connected, during the operation of this control device, to the operating gas bellows 32. The operating gas in the bellows 32 may be the same as the sample gas. That is, the sample gas may be passed through the bank of switches 21 and into the operating gas bellows 32, as shown in Figure I, in a pressure overage to start the automatic control action of this device. The operating gas bellows 32 is provided with vent to atmosphere valve arrangement of a diaphragm 37 which supports a ball 38 for movement toward and from a resilient O-ring 39 to open or close the vent valve. As a means of damping the vent valve action, a "pig-tail" pneumatic resistance 40 is provided as the actual outlet from the reference gas bellows 32 into the vent valve. A vent pipe 41 is provided to carry the excess gas to atmosphere. The vent valve is operated by variable pressure as applied to the outer face of the diaphragm 37 through a back pressure pipe 42 from the nozzle 35. The nozzle 35 is supplied with a pneumatic flow from a source pipe 43 through a restrictor 44 with the vent valve pipe 42 taken off from this arrangement between the restrictor 44 and the nozzle 35. Thus the variable restriction of the nozzle 35 by the baffle 34 variably operates the vent valve diaphragm 37 to variably vent the operating gas bellows 32.

The sample gas and that used in the bellows 32 is the same. An important gas relationship in this device is that between the gas in the reference bellows 27 and the gas in the sample conduit 12. For the best possible action with the absolute minimum of error, the gas in the reference bellows 27 and the gas in the sample gas conduit 12 should be first, ideal gases, and second, they should be identical with each other. On this basis if the operating temperature rises, raising the pressure in the sealed bellows, the double bellows system will balance at some higher pressure. Since the rise in pressure is exactly proportional with the rise in temperature in an ideal gas, the gas density in the sample volume will remain constant, that is to say, the fixed volume conduit 12 will always be provided with a constant mass of gas. On the other hand, actual gases will deviate slightly from this ideal situation. The error caused will be relatively small however, and easily within allowable limits over the desired ranges of operating temperature. It is preferable to place in the reference bellows 27 not an ideal gas but an actual gas which is identical with the sample gas which, of course, also is not an ideal gas. With these two gases identical, action is produced within this control arrangement well within allowable error limits over reasonable ranges of operation. It is also possible, and in some cases somewhat more practical, to place in the reference bellows 27 a gas which is not the same as the sample gas. For example, the reference bellows 27 might be filled with one particular gas and the system thereafter used for the measurement of several similar forms of sample gas. Even with this arrangement the relative error due to the difference in the sample and reference gases is well within allowable limits over reasonable ranges of operation.

The pressure in the reference bellows 27 may be varied through manipulation of the valve 30. For different measurements or different sample gases it may be desired that the sample slug be of a different mass. One way of doing this would be to substitute different lengths of the fixed volume conduit for the conduit 12 as shown, that is, a different length of pipe for the different measurements. However, the same effect can be achieved by changing the pressure in the reference bellows 27. This operates to produce a different mass in the same length of pipe 12.

The opposing reference and operating pressure bellows 27 and 32 cancel out barometric pressure change effects with respect to the mass of the gas sample in the conduit 12. This arrangement also compensates for temperature changes in the ambiency of this device, and especially as with respect to the reference bellows 27, in the gas therein. Thus the mass in the sample gas in the conduit 12 remains constant regardless of temperature variations as applied to the device. As a means of assuring this action, an important factor in this invention is that the temperature of the gas in the reference bellows 27 and the temperature of the sample gas in the conduit 12 be maintained essentially equal. In the Figure I structure a dotted line 45 indicates a housing arrangement or enclosure representing a common dominant temperature ambiency, derived from the associated process temperature, which maintains equal temperature throughout this enclosure and especially with respect to the reference bellows 27 and the fixed volume conduit 12. Changes in this ambient temperature are immaterial as long as a single temperature is applied to both the reference bellows 27 and the fixed volume conduit 12. This is a "dominant ambient temperature" conception of this arrangement. Other suitable arrangements could be made if desired. For example, the reference bellows 27 and the fixed volume conduit 12 may be located in heat exchanging relationship with respect to each other, with the temperature of one dominating the temperature of the other. Similarly, two temperature ambiencies may be used, with the reference bellows 27 in one, and the fixed volume conduit 12 in the other. In the latter case the two temperature ambiencies must be maintained equal. In the final analysis the desired essential is that the temperature in the reference bellows 27 and the temperature in the fixed volume conduit 12 be maintained equal. It is not critical what this temperature is within reasonable limits but it is critical that essential equality be maintained.

The Figure II alternate structure is a space saving "pancake type" of gas sample control system according to this invention. It comprises a housing 46 having a main chamber therein with a diaphragm 47 mounted transversely of said main chamber to provide two opposed variable volume chambers, a reference gas chamber 48 and an operating gas chamber 49. This is a self-actuating device in that a vent nozzle 50 is mounted through the wall of the operating gas chamber 49. The nozzle 50 is mounted for pre-operation adjustment toward and away from the diaphragm 47. Thus as the differential pressure between the reference chamber 48 and the operating pressure chamber 49 varies, the diaphragm 47 is moved toward and away from the nozzle 50 in variably restricting fashion so as to variably restrict the venting of the operating chamber 49 to atmosphere. The valve switching unit as at 51 is the same as, and operates in the same manner as, the valve switching unit 11 of Figure I. That is, with the difference that the fixed volume sample conduit 52 extends into and along inside of the housing wall adjacent the reference gas chamber 48. This is another method of maintaining the temperature of the reference gas and of the fixed volume sample gas equal. In this case, the temperature of the housing 46 is dominant and makes the incoming sample gas temperature equal to it. Through a pneumatic pipe connection 53 from the pneumatic switching arrangement 51 to the operating gas chamber 49, the fixed volume sample gas conduit 52 is associated with the control device in the same manner as in Figure I. Further, provision is made for supplying, changing or adjusting gas to and in the reference chamber 48 in the same manner and for the same purposes as described in connection with the reference gas of Figure I. This arrangement comprises a gas inlet pipe 52', a valve 53', and a pressure indicator 54.

The alternate structure of Figure III is also a space saving "pancake" type of control system according to this invention which adds to the structure of Figure II the feature of pilot operation which is useful in many applications. This Figure III structure comprises a housing 55 with a main chamber therein divided into a reference gas chamber 56 and an operating gas chamber 57 by a diaphragm 58. The operating gas chamber 57 is vented by means of a pilot valve 59 which variably vents the operating gas chamber 57 to atmosphere through a wall opening 60 and a vent opening 61. The pilot valve 59 is operated from an air source inlet pipe 62 through a pneumatic restrictor 63 in terms of the back pressure from an adjustable nozzle 64. The nozzle 64 is located outside of the housing 55 and is variably restricted by the movement of a connection shaft 65 which is secured to the main diaphragm 58 and extends from both sides thereof through side wall openings 66 and 67 in the housing 55. A pair of outer diaphragms as at 68 and 69 are provided for sealing the reference and operating gas chambers to prevent loss of gas through the side wall openings 66 and 67. These external diaphragms 68 and 69 are each secured to an end of the connection shaft 65 as a means of balancing barometric effects and as a means to variably restricting the nozzle 64 upon the movement of the main diaphragm 58. Such nozzle restriction provides a back pressure which is used to operate the pilot valve 59. As in the other structures of this invention, a variable pre-operation reference gas supply arrangement 70 is provided, as well as a pneumatic valve switching arrangement 71 and pneumatic connection therefrom to the operating pressure chamber as indicated in pipe 72. A variation in this structure from previous structures described herein, is that the fixed volume conduit 71' extends actually inside the reference gas chamber 56. Again, this location is for the purpose of maintaining equal the temperature of the reference gas and the temperature of the sample gas in the fixed volume conduit.

In this Figure III structure as well as that of Figure II, reliance may to some extent be placed upon heat exchange action between the reference gas chamber housing and the fixed volume sample gas conduit. On the other hand, if desired, the single temperature ambiencies as indicated by dotted line 73 in Figure III and 52" in Figure II may be relied upon to maintain equal temperature in the reference gas and in the sample gas in the fixed volume conduit.

Figure V is a variation of the Figure I structure to provide a self-actuating system like that of Figure II except that opposing bellows are used instead of a pair of diaphragm separated chambers as in Figure II. In Figure V a reference bellows 74 is provided in opposition to an operating gas bellows 75 with an adjustable vent plug 76 mounted in the operating gas bellows 75 to be variably restricted by the movement of the wall 77 which separates the bellows 74 and 75. As in the other structures of this invention, a pneumatic switch arrangement is provided as at 78 with, as an associated part thereof, a fixed volume sample conduit 79. The switch arrangement 78 is connected to the operating gas bellows 75 in the usual manner and for the usual purposes, by means of a pneumatic pipe 80. The reference gas bellows 74 is serviced on a pre-operation basis by the usual gas source means as at 74'.

The Figure VI alternate structure is another self-actuated system according to this invention using opposed bellows. These are a reference bellows 81 and an operating gas bellows 82. A vent pipe from the operating gas bellows 82 as at 83 leads to a vent nozzle 84. Variable restriction of the nozzle 84 is accomplished by a baffle 85 which moves in accordance with the differential pressure of the bellows 81 and 82. The reference gas bellows 81 is serviced on a pre-operation basis by the usual gas source means 86. Further, the device is provided with the usual pneumatic switch arrangement 87 having associated therewith, a fixed volume sample gas conduit 88 and an output pipe 89 which is operatively connected to the operating gas bellows 82. Here again, in Figures V and VI, a single temperature ambiency is indicated by dotted lines 80' in Figure V and 90 in Figure VI. In this fashion, once more the reference gas in the reference gas bellows and the sample gas in the fixed volume sample conduit are maintained at equal temperatures.

This invention therefore provides, in a chromatographic gas analysis system, a new and useful gas sampling system for repeatably providing a fixed volume of gas at a constant mass.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

1. In a chromatographic gas analysis device, a gas sample control system for repeatably producing gas samples of fixed volume and constant mass to a high degree of accuracy by cancelling out barometric pressure effects and by varying the pressure of a constant volume gas sample in response to temperature effects on a body of reference gas, said gas sample control system comprising, in combination, fixed volume means for containing a body of sample gas, a closed bellows for containing a body of reference gas, means for maintaining essentially equal the temperatures of the sample gas in said fixed volume means and of the reference gas in said reference bellows, an opposition bellows for containing sample gas in force opposition to the expansion of said reference bellows by said reference gas, a pneumatic connection sample gas passage from said fixed volume means to said opposition bellows, a pneumatic bleed valve from said opposition bellows to atmosphere, and means for variably operating said bleed valve in accordance with the movements of the expansion and contraction of said reference bellows, whereby the said opposition of said bellows cancels out barometric pressure effects on said system, and compensates for temperature change effects on said system, to produce a constant mass gas sample in said fixed volume means on an accurately repeatable basis.

2. In a chromatographic gas analysis device, a gas sample control system for repeatably producing gas samples of fixed volume and constant mass to a high degree of accuracy by cancelling out barometric pressure effects and by varying the pressure of a constant volume gas sample in response to temperature effects on a body of reference gas, said gas sample control system comprising, in combination, fixed volume means for containing a body of sample gas, a housing with a chamber therein, a flexible diaphragm in said chamber and dividing said chamber into a variable volume sample gas chamber and a variable volume reference gas chamber, means for maintaining essentially equal the temperatures of the sample gas in said fixed volume means and of the reference gas in said reference chamber, a sample gas passage connection from said fixed volume means to said sample gas chamber, and a pneumatic bleed valve from said sample gas chamber to atmosphere, means responsive to the expansion or contraction of said reference gas chamber to variably restrict said bleed valve, whereby the pressure opposition of said chambers cancels out barometric pressure effects on said system and compensates for temperature change effects on said system to produce a constant mass gas sample in said fixed volume means on an accurately repeatable basis.

3. In a chromatographic gas analysis device, a gas sample control system for repeatably producing gas samples of fixed volume and constant mass to a high degree of accuracy by cancelling out barometric pressure effects and by varying the pressure of a constant volume gas sample in response to temperature effects on a body of reference gas, said gas sample control system comprising, in combination, fixed volume means for containing a body of sample gas, a chambered housing, a diaphragm in said chamber which provides an expansible and contractible reference chamber for containing a body of reference gas and an opposition expansible and contractible sample gas chamber for containing sample gas in force opposition to said reference gas, means for maintaining essentially equal the temperatures of the sample gas in said fixed volume means and of the reference gas in said reference chamber, means for adjustably varying the pressure in said reference gas chamber prior to the operation of said control system as a means of producing the effect of changing the volume of said fixed volume means, a pneumatic operation connection from said fixed volume means to said sample gas chamber, a pneumatic bleed valve from said sample gas chamber to atmosphere, and means for variably operating said bleed valve in accordance with the movements of expansion and contraction of said reference gas chamber, whereby said opposition of said reference and sample gas chambers cancels out barometric pressure effects on said system and compensates for temperature change effects on said system, to produce a constant mass gas sample in said fixed volume means on an accurately repeatable basis.

4. In a chromatographic gas analysis device, a gas sample control system for repeatably producing gas samples of fixed volume and constant mass to a high degree of accuracy by cancelling out barometric pressure effects and by varying the pressure of a constant volume gas sample in response to temperature effects on a body of reference gas, said gas sample control system comprising, in combination, fixed volume means for containing a body of sample gas, a housing with a central chamber therein, a main diaphragm separating said central chamber into an expansible and contractible reference gas chamber and an expansible and contractible sample gas chamber, an externally open recess in said housing adjacent said sample gas chamber and a second externally open recess in said housing adjacent said reference gas chamber, a diaphragm sealing off each of said external recesses, openings through said housing for connecting said reference and sample gas chambers, with their respective external recesses, a mechanical connection from said central chamber diaphragm to each of said recess diaphragms through said housing openings as a means of operationally connecting all of said diaphragms, a pilot bleed valve in said sample gas chamber for venting said sample gas chamber to atmosphere, a bleed nozzle mounted for variable restriction in accordance with the movement of the external recess diaphragm of the sample gas chamber, a back pressure connection from said nozzle to said pilot valve as a means of operating said pilot valve in accordance with the movements of said main diaphragm, a pneumatic connection sample gas passage from said fixed volume means to said sample gas chamber, whereby said reference and sample gas chambers in their opposition cancel out barometric pressure change effects on said system, and compensate for temperature change effects on said system, to produce a constant mass gas sample in said fixed volume means on an accurately repeatable basis.

5. In a chromatographic gas analysis device, a gas sample control system for repeatably producing gas samples of fixed volume and constant mass to a high degree of accuracy by cancelling out barometric pressure effects and by varying the pressure of a constant volume gas sample in response to temperature effects on a body of reference gas, said gas sample control system comprising, in combination, fixed volume means for containing a body of sample gas, a closed bellows for containing a body of reference gas, an opposition bellows for containing sample gas in force opposition to the expansion of said reference bellows by said reference gas, a pilot valve in said sample gas bellows for venting to atmosphere, a variable restrictor baffle mounted between said bellows and operable in accordance with the differential pressure thereof, a pneumatic nozzle variably restrictable by said baffle, a back pressure connection from said nozzle to said pilot valve as a means of venting said sample gas bellows in accordance with the differential pressure between said sample gas bellows and said reference gas bellows, a pneumatic connection sample gas passage from said fixed volume means to said sample gas bellows, whereby the said opposition of said bellows cancels out barometric pressure effects on said system and compensates for temperature change effects on said system, to produce a constant mass gas sample in said fixed volume means on an accurately repeatable basis, means for adjustably varying the pressure in said reference gas bellows on a pre-operation basis, to provide the effect of adjustably changing the volume of said fixed volume means, and a valving arrangement for automatically filling said fixed volume means with a sample gas, closing off said fixed volume means after the constant mass producing operation of said system, and for thereafter applying a carrier gas to said fixed volume means to move said fixed volume constant mass gas sample to a chromatographic column.

6. In a chromatographic gas analysis device, a gas sample open-end control system for repeatably producing gas samples of fixed volume and constant mass to a high degree of accuracy by cancelling out barometric pressure effects and by varying the pressure of a constant volume gas sample in response to temperature effects on a body of reference gas, said gas sample control system comprising, in combination, fixed volume means for containing a body of sample gas, an operationally fully closed, gas pressure expansible and contractible housing for containing a body of reference gas, means for maintaining essentially equal the temperatures of the sample gas in said fixed volume means and of the reference gas in said reference housing, an opposition expansible and contractible housing for containing sample gas in force opposition to the expansion of said reference housing by said reference gas, a pneumatic connection sample gas passage from said fixed volume means to said sample gas housing, a pneumatic bleed valve from said sample gas housing to atmosphere, means for variably operating said bleed valve in accordance with the movement of expansion and contraction of said reference gas housing, said system defining a continuous pneumatic flow passage into and through said fixed volume means through said pneumatic connection sample gas passage, and through said opposition housing to atmosphere by way of said bleed valve, with said passage restrictable by said bleed valve operating means, whereby the said opposition of said housings cancels out barometric pressure effects on said system, and compensates for temperature change effects on said system, to produce a constant mass gas sample in said fixed volume means on an accurately repeatable basis, and valving means for isolating said fixed volume means from said flow passage at both the input to and output from, said fixed volume means.

References Cited in the file of this patent
UNITED STATES PATENTS

| | | |
|---|---|---|
| 2,520,468 | Moore | Aug. 29, 1950 |
| 2,833,151 | Harvey | May 6, 1958 |